United States Patent [19]

Woyton et al.

[11] Patent Number: 4,534,114
[45] Date of Patent: Aug. 13, 1985

[54] COUPLING ALIGNMENT SYSTEM

[75] Inventors: Joseph T. Woyton, Mauldin; George G. Grant, Greer, both of S.C.

[73] Assignee: Reliance Electric Company, Greenville, S.C.

[21] Appl. No.: 598,082

[22] Filed: Apr. 9, 1984

[51] Int. Cl.³ .............................................. G01B 3/30
[52] U.S. Cl. ................................................ 33/181 R
[58] Field of Search ................... 33/412, 181 R, 180 R

[56] References Cited

U.S. PATENT DOCUMENTS

| 2,815,582 | 12/1957 | Karstens . | |
|---|---|---|---|
| 2,819,534 | 1/1958 | Kitzman . | |
| 2,833,051 | 5/1958 | Cunningham | 33/180 R |
| 3,174,302 | 3/1965 | Pomper . | |
| 3,664,029 | 5/1972 | Glucoft . | |
| 4,115,925 | 9/1978 | Malak . | |
| 4,128,945 | 12/1978 | Barritt . | |
| 4,161,068 | 7/1979 | McMaster | 33/412 |
| 4,304,501 | 12/1981 | Gordon et al. . | |
| 4,367,594 | 1/1983 | Murray | 33/181 R |

FOREIGN PATENT DOCUMENTS

| 566250 | 12/1932 | Fed. Rep. of Germany | 33/180 R |
|---|---|---|---|
| 972407 | 8/1950 | France | 33/181 R |
| 828479 | 2/1960 | United Kingdom . | |

OTHER PUBLICATIONS

Zurn Industries, Inc. catalogue, pp. 80–87.
IMS brochure—"Mini Alignment Computer by IMS" copyright 1981.
MMS brochures, (2), *Modular Hardware System* and *Rotating Machinery Alignment System*.
Hughes & Associates training brochure—1974 "Reverse Indicator Method of Alignment".

*Primary Examiner*—Harry N. Haroian
*Attorney, Agent, or Firm*—Marmaduke A. Hobbs

[57] ABSTRACT

A coupling alignment system for use in aligning coupled, rotatable shaft members. The system includes coupling hubs mounted on the opposed shafts and modified to receive bracket members. A pivotally mounted beam extends from one bracket member to the opposite bracket member or coupling hub, and a measurement indicator, mounted on the bracket member, registers the degree of deflection of the beam relative to the bracket or hub on the opposite side. No shaft access is required, since the brackets are secured directly to the coupling hubs, and the measurement indicator mass is firmly supported by the bracket, minimizing indicator sag. The present system includes angular, radial, and axial bracket mounting embodiments, the system, thereby, greatly facilitating alignment procedures in the field.

18 Claims, 6 Drawing Figures

COUPLING ALIGNMENT SYSTEM

BACKGROUND OF THE INVENTION

When rotational motion must be transmitted from a motor or other driving element to a driven element, for example a fan blower, shaft couplings are used effectively to connect the driving and driven shafts. This allows synchronous power transmission without the need for an additional motor, and greatly lessens the cost of operation and simplifies the motor control system. The coupled shafts must be precisely aligned in both the vertical and horizontal planes to minimize wear on the couplings, seals, shafts, and bearings, and to minimize energy consumption, which increases greatly as misalignment occurs and progressively worsens. Precise alignment is difficult to obtain and even more difficult to sustain under operating conditions; however, for optimum performance, it is necessary that the center lines of the shafts be both concentric and coinciding when the equipment reaches equilibrium operating condition.

Misalignment, where present, may be angular where the projected center lines of the shafts intersect at an angle, or it may be parallel offset where the projected center lines of the shafts are parallel but are not concentric. In addition, the conditions may exist simultaneously and two shafts may exhibit both parallel and angular misalignment. Factors which may cause misalignment include uneven settling of the foundation beneath the components, expansion of the shafts or other affected members due to the heat of operation, shaft deflection, wear on the coupling or in the bearings which affects clearance, and dimensional changes in the structural and rotating elements. Operation of the affected components where substantial misalignment is present results in excessive vibration, power loss, and early wear, with ultimate failure of one or more of the elements. Slight and unavoidable misalignments have been compensated for in the past by the use of flexible couplings. These couplings transmit power while flexing, to accommodate slight variances; however, they are not designed as a substitute for proper shaft alignment procedures. Operation of the machinery while misaligned causes early wear and, ultimately, failure of the flexible coupling also, especially in the flexible element itself.

Shaft alignment procedures are widely known and practiced in industry, and several methods are currently in use. Examples include the reverse indicator method, where measurement readings are made from one shaft to the other and then back again, generally considered to be the most accurate method; the rim and face method, in which the coupling is disassembled, and two dial indicators mounted on a beam are used for measurements against the rim and face of the exposed hubs; and even a trial and error procedure, in which readings are taken as in the reverse indicator method, but the required calculations and graphical representations are foregone in favor of slight trial movements of the machinery. One of the shafts to be aligned is considered to be stationary and the other shafts are aligned to the stationary unit. Most current methods involve mounting a clamp on the fixed shaft, using upper and lower clamp halves connected by chains or long bolts. Extending outwardly from the clamp is a rod, which connects to a second rod that extends horizontally across the coupling. A third rod is then extended from the second rod to the shaft to be aligned, and measurement indicators reflect the degree of misalignment in the horizontal and vertical planes. Readings are taken from the indicators, normally at ninety degree intervals, and the results are either plotted graphically or fed into a specially programmed computer. Either of these methods can be used to calculate the amount which the machine or component must be moved to align the shaft with the fixed reference shaft.

There are certain inherent disadvantages present in the shaft-mounting arrangement. If there is a limited amount of available space on the shaft to mount the clamps, the coupling must be disassembled and removed before alignment can proceed. Replacing the coupling may then skew the alignment. Where large shafts are to be aligned, additional elements, such as larger clamps and longer chains or bolts, may be necessary, requiring the stocking or availability of a plurality of different sized clamp members. Since the measurement apparatus must extend outwardly from the reference shaft to a point outside the coupling radius, and from there horizontally across the coupling to the second shaft, indicator sag effects, from the weight of the indicator on the extended rod, are normally a problem. While compensation factors for indicator sag effects have been developed, they are only an estimation and, therefore, introduce further uncertainty into the alignment equation. The cumulative effect of these disadvantages normally requires that several movements of the component to be aligned be undertaken before an acceptable shaft alignment is reached.

SUMMARY OF THE INVENTION

It is, therefore, one of the principal objects of the present invention to provide a coupling alignment system adapted for mounting on a coupling hub, thereby eliminating the need for access to either shaft and, consequently, the need to disassemble and remove the coupling.

Another object of the present invention is to provide for greater stability in mounting the coupling alignment system, using a coupling hub having a plurality of mounting sites to which a reference bracket is secured, serving to hold a measurement indicator and to furnish a reference surface for measurement by the indicator on the opposite side of the coupling.

A further object of the present invention is to minimize indicator sag effects, with as much as a 10 to 1 reduction being exhibited, due to mounting the measurement indicator on the fixed bracket as opposed to mounting on the rod member which extends across the coupling, and to provide direct reading of one of the input parameters required for the alignment measurement using a marked, calibrated beam.

A still further object of the present invention is to provide a coupling alignment system which is easily adjusted for various mechanical installations, yet has a minimum of parts, and which provides for greater accuracy, thereby facilitating the alignment process in the field.

These and other objects are attained by the present invention, which relates to a coupling alignment system for use in aligning coupled, rotatable shaft members. The system includes specially modified coupling hubs for mounting on the shaft members, and at least one bracket member for mounting on the hub. The bracket is secured to the hub with suitable fasteners, and an extension means or beam extends across the coupling to the opposite hub or bracket. A measurement device is then used to detect the degree of deflection of the extension means relative to the hub on the opposite side of the coupling. Various embodiments are contemplated and described in detail below; however, a preferred embodiment includes identical coupling hubs and bracket members for each shaft member. The extension means are placed against a portion of the opposite, facing bracket, each, in turn, serving as a reference surface for the opposite beam.

Since the present system is secured directly to the coupling hubs, shaft access is unnecessary, and the present system can easily be held with one hand and fastened with the other, in contrast to earlier systems which must be assembled during the mounting stages. The system also provides for mounting a measurement indicator on the bracket member rather than on the beam, in contrast to prior art systems. This greatly minimizes indicator sag effects and provides a system with increased stability and accuracy, thereby facilitating the alignment process in the field.

Various other objects and advantages will become apparent from the description below, with reference to the accompanying drawings.

DETAILED DESCRIPTION OF THE PREFERRED EMBODIMENT

Figure 1:
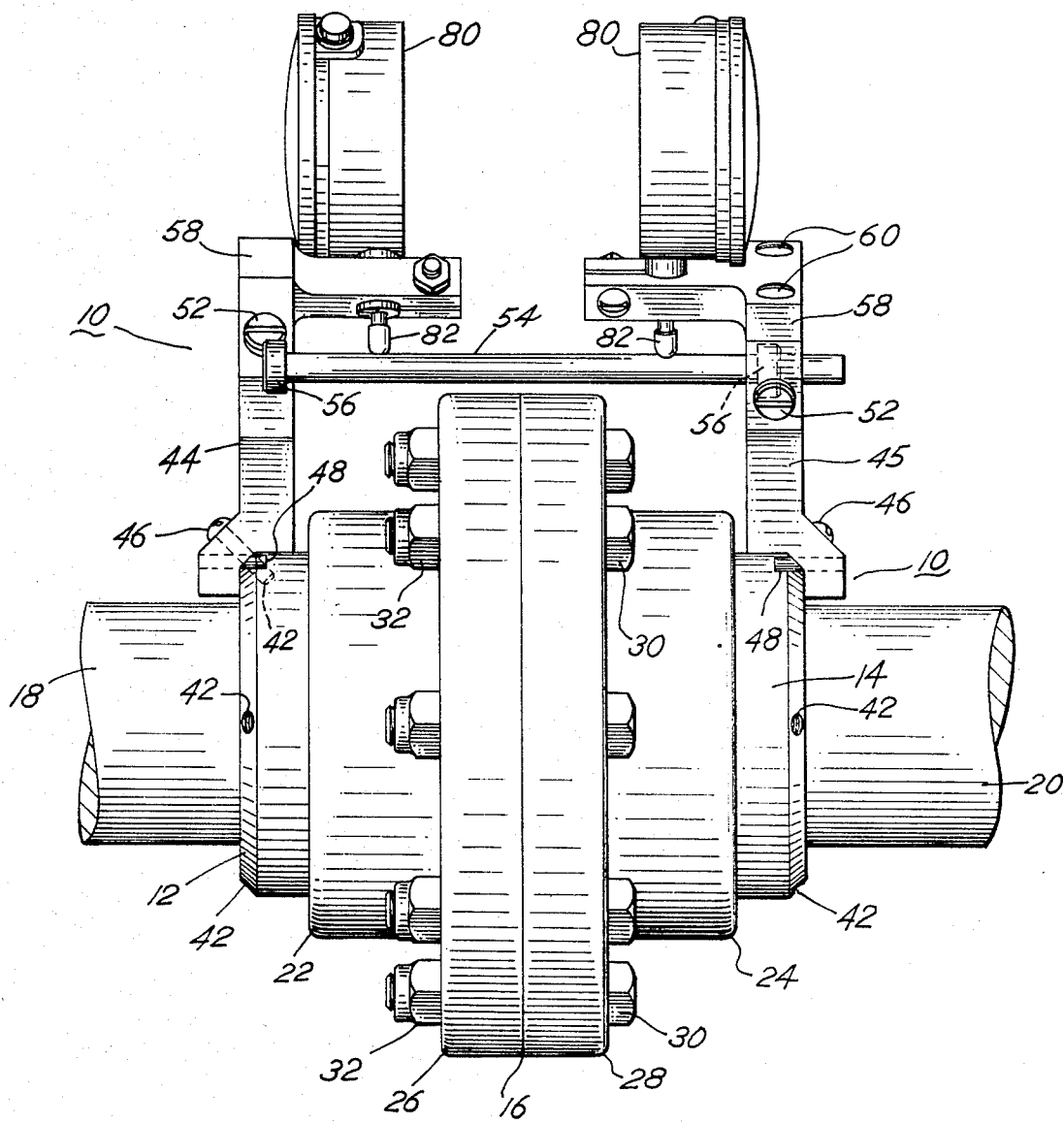
FIG. 1 is a side elevational view of a shaft coupling with two coupled shaft members secured therein, showing the coupling alignment system including the coupling hubs, embodying the present invention.

Referring more specifically to the drawings, and to FIG. 1 in particular, numeral 10 designates generally the coupling alignment system and the specially adapted coupling hubs embodying the present invention. The present system is shown here mounted on the special coupling hubs 12 and 14, which also comprise a part of the present invention. The hubs are part of a shaft coupling 16, which is used for coupling a first shaft 18 in end to end relation with a second shaft 20. The shaft coupling includes a first sleeve member 22 and a second sleeve member 24, with radially extending annular flanges 26 and 28, respectively, the flanges being secured together by a plurality of bolts 30 and nuts 32. Various types of shaft couplings may be used with the present invention, coupling 16 being shown here as an example of a generally suitable type. The present system has been designed to use the reverse indicator alignment method, generally considered to be the most accurate, and the preferred method in the industry. This procedure has, in the past, required a relatively high level of skill and knowledge on the part of the alignment mechanics; however, the present system has been simplified, both structurally and in the method of making measurements, thereby reducing the level of knowledge and skill required to successfully use the system.

Coupling hubs 12 and 14 are normally secured to their respective shafts with bushings 40 in a conventional manner. The hubs have been modified to include mounting holes 42, each hole being disposed about the periphery of the hub at ninety degree intervals, for mounting bracket members 44 or 45 and for ensuring balance in the rotatable hub during operation. The bracket members are identical to one another, and a portion of each member serves as a reference surface for measurements made from the opposite member, as explained below. For some applications, measurements can be made using only one bracket member, the procedure for which will also be explained below. Bracket members 44 and 45 are mounted opposite one another and extend radially outwardly from the mounting sites on the hub, being secured thereon with suitable fasteners, such as screws 46. In the embodiment shown in FIGS. 1 through 3, mounting holes 42 are set at an approximate forty-five degree angle relative to the outer surface or the face of the hub. A portion of the bracket member rests against the coupling hub on each side of screws 46; thus, when the bracket member is mounted, force is applied by the bracket member against the hub in three directions, i.e. horizontally, vertically, and angularly, thereby ensuring a secure mounting. The mounting is further secured and eased by the use of locating dowel pins 48, which rest, one on each side of a selected mounting hole 42, for locating the bracket member on the hub in proper orientation for mounting, and for providing an additional, and widened, load-bearing surface, in conjunction with the surface of the hub, for supporting the bracket member.

Pivotally mounted within each bracket member 44 and 45, is a swivel block 50, like parts having been given like numbers. The blocks are secured therein with suitable fasteners, such as set screws 52, which are accessible from either the right or left side of the bracket members. Secured within the swivel block is an extension means, such as marked, calibrated beam 54, which extends from the swivel block, across the coupling 16, to the bracket member on the opposite side of the coupling hub. The beam can be shortened or lengthened, as required by the particular application, by loosening a set screw (not shown), which holds the beam within the block at a specific length, and sliding the beam radially through the swivel block in the direction required. Secured near the end of beam 54, opposite the swivel block 50, is a contact means or bead 56 for contacting the reference surface of the facing bracket member. Beam 54 is marked and calibrated to provide a direct reading of one of the input parameters required in computing the proper alignment, that of the distance between the faces of the coupling hubs.

Indicator support members 58 are secured to the upper surfaces of bracket members 44 and 45 with screws 60, the members being adapted to hold either the conventional dial indicator 80, as shown here, or another type of measurement device, such as an eddy current probe or a linear variable differential transformer (L.V.D.T.). The dial indicator shown includes a probe 82 extending axially from the indicator, which contacts the calibrated beam 54 and measures the degree of deflection of the beam in the horizontal and the vertical planes, depending on the orientation of the bracket member and beam and the particular readings being taken.

Figure 4:
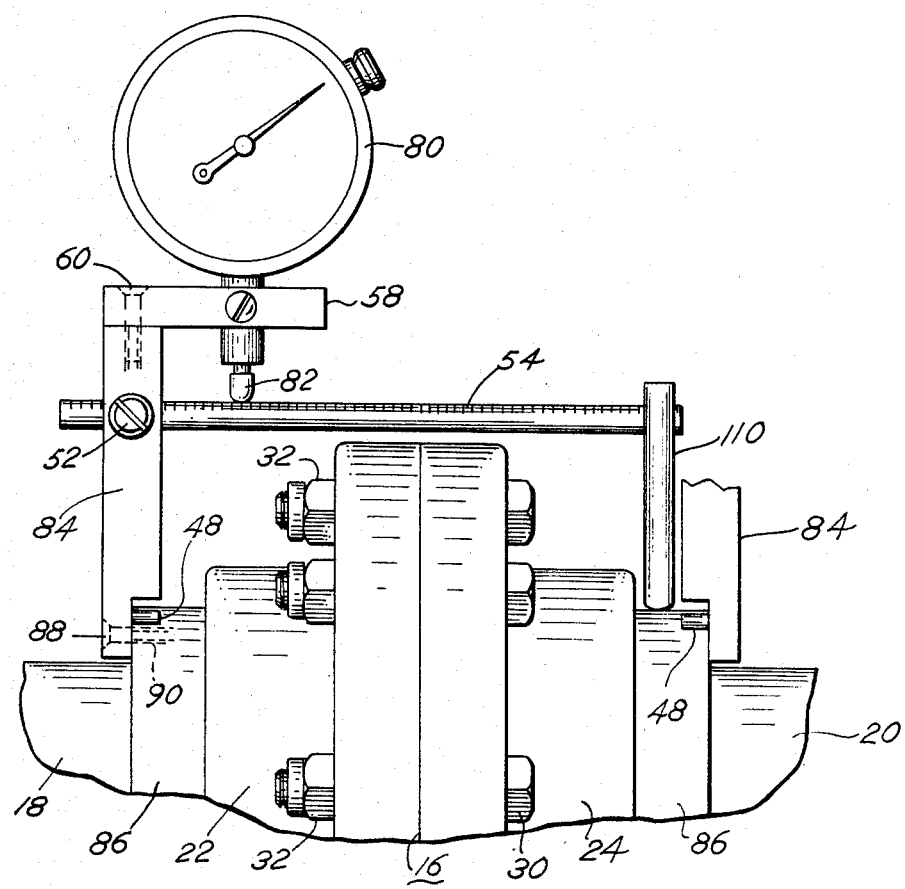
FIG. 4 is a side elevational view of the coupling and coupling alignment system, illustrating an alternative mounting embodiment.
Figure 5:
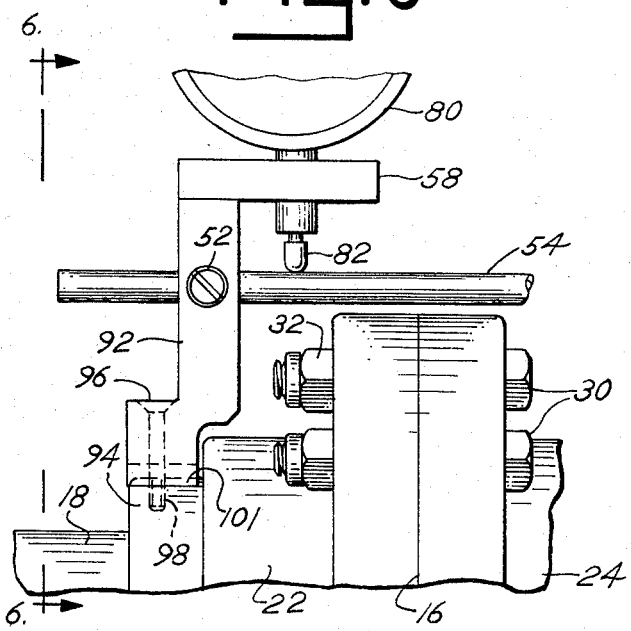
FIG. 5 is a side elevational view of the coupling and coupling alignment system, illustrating an alternative mounting embodiment.
Figure 6:
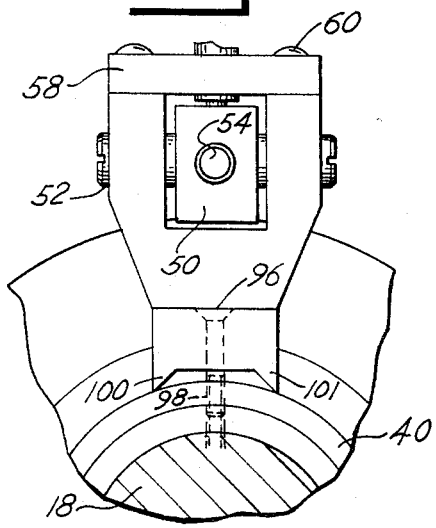
FIG. 6 is an elevational and cross-sectional view of the present system and mounting arrangement shown in FIG. 5, the section being taken on line 6—6 of FIG. 5.

Alternative structural embodiments of the coupling hubs and the bracket members are shown in FIGS. 4 through 6. These embodiments may be used where desirable, or where dictated by spatial limitations, and like parts have been given like numerals. In FIG. 4, an axial mounting arrangement is disclosed. A bracket member 84 is secured to a modified coupling hub 86 with a suitable fastener, such as screw 88, which is inserted through the bracket and into an axially disposed hole 90, located at ninety degree intervals around the hub. As in the previously disclosed embodiment, locating dowels 48 are used as a positioning and stabilizing aid. FIGS. 5 and 6 disclose a radial mounting arrangement, which is particularly advantageous where space is at a premium at the end of the hubs, in that space is required only at the outer circumferential surface of the hub. A bracket member 92 is secured to the outer circumferential surface of modified coupling hub 94 with a suitable fastener, such as screw 96. The screw is inserted through the bracket member and into a radially disposed mounting hole 98 in hub 94, again, located at ninety degree intervals around the hub. Legs 100 and 101 on the inner end of the bracket seat on the circumferential surface of hub 94 and are used as a positioning and stabilizing aid in this embodiment, the legs being positioned on opposite sides of the radial hole.

Figure 2:
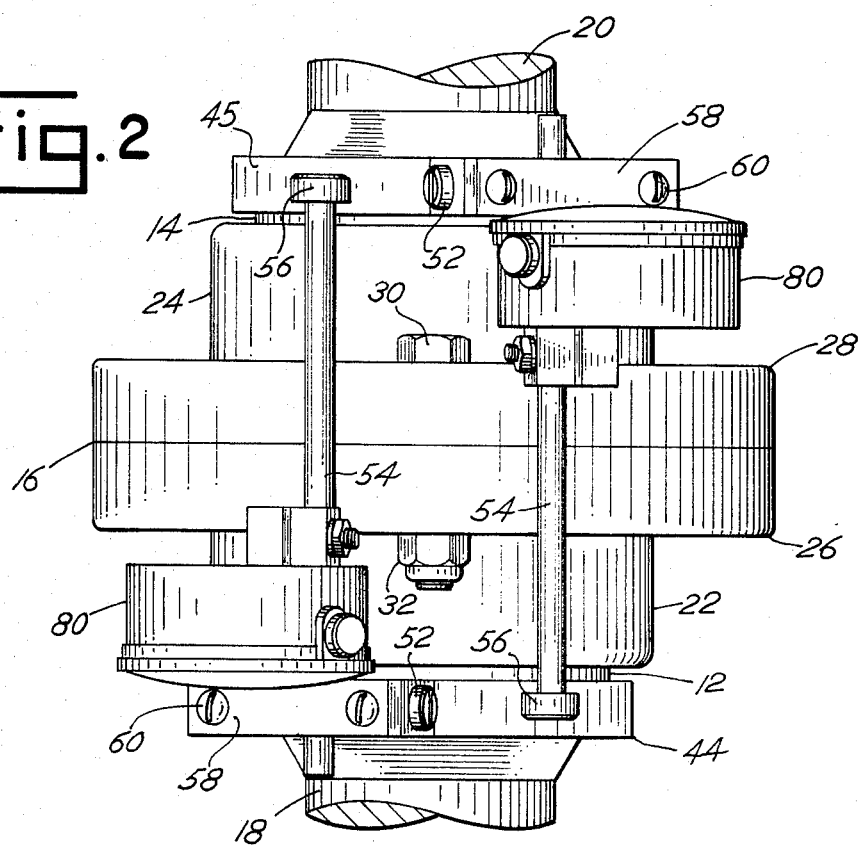
FIG. 2 is a top plan view of the mounted coupling alignment system shown in the preceding figure.
Figure 3:
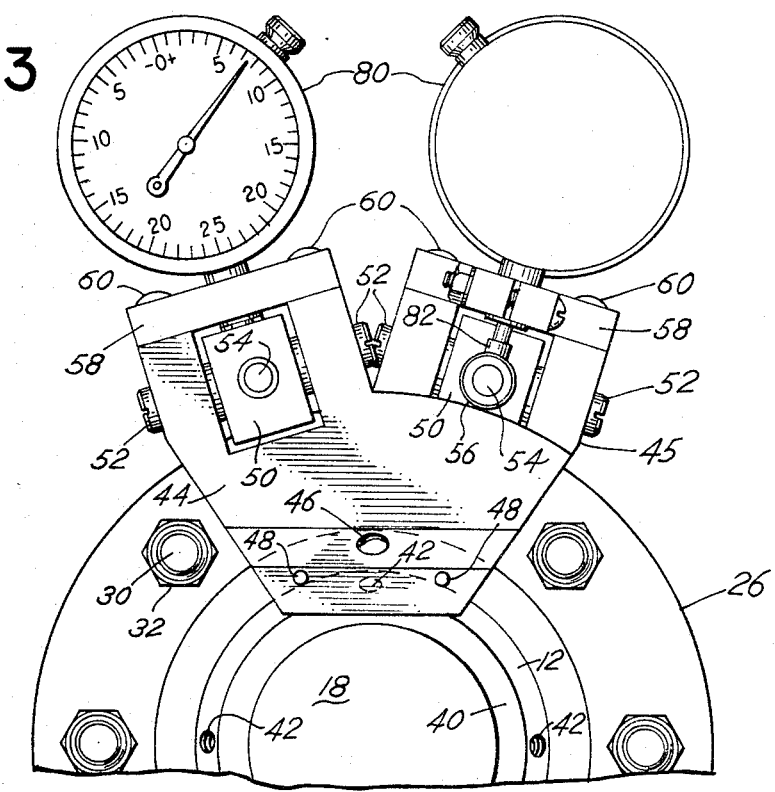
FIG. 3 is an end elevational view showing the upper half of the shaft coupling and mounted coupling alignment system shown in the preceding figures.

In FIGS. 1 through 3, two bracket members 44 and 45 are shown, and in FIGS. 4 through 6, one bracket member 84 or 92 is shown, one for each mounting embodiment. Either one or two bracket members may be used for making any of the alignment measurements and calculations, as a matter of choice, convenience, or as dictated by the particular requirements of the installation. Both in theory and design, as few as one bracket member, or as many as eight bracket members, may be used in the present system; however, the most common and economical procedure will employ two bracket members. If two bracket members are used, measurement readings are normally made from one bracket to the other. If one bracket member is used, measurement readings may be made by using a contact means, such as foot 110, which is slidable along beam 54 and extends from the beam to contact the coupling hub opposite the mounted bracket member, as shown in FIG. 4.

In the use and operation of the present coupling alignment system, the machinery containing the shafts to be aligned is checked to ensure solid footings, since this is where the adjustments will be made, and one of the shafts is chosen as a reference and considered fixed. The remaining shafts in the power transmission arrangement are then aligned to the first, or reference, shaft. Modified coupling hubs 12 and 14 for angular mounting, hub 86 for axial mounting, or hub 94 for radial mounting, are then secured to the facing ends of the shafts 18 and 20, to be aligned, using conventional securing means, such as bushings 40. The choice of hubs will be determined with regard to the requirements of the installed machinery having the shafts to be aligned. For example, where space adjacent the hub is very limited, the radial mounting embodiment will be used, since no access to the machine side of the hub is required. The preferred embodiment will normally use the angular mounting due to its greater stability. The coupling 16 may then be assembled on the facing hubs by securing flanges 26 and 28 together with bolts 30 and nuts 32.

As noted earlier, the present coupling alignment system has been designed to use the reverse indicator alignment method. This method involves first measuring the distances between the outer and inner feet of the machines, between the inner feet and the face of the coupling hub, and between the faces of the two coupling hubs, the latter of which may be determined directly from the marked, calibrated beam 54. To this data are added thermal rise figures, which are standards indicating the relative movement of the machinery due to the heat of operation, and, normally, figures which take into account indicator sag. Measurement readings are then taken from one side to the other and back again at ninety degree intervals around the shaft or hub, the top and bottom readings used for computing vertical alignment, and the side readings for computing horizontal alignment. The collected data are then either plotted graphically, or fed to a calculator or computer, to calculate the movements of the machinery necessary to align the shafts.

For purposes of description, assume shaft 18 is the fixed or reference shaft. Having assembled the couplings on the specially modified coupling hubs, with one of the holes 42, 90, or 98 at the zero degree position, the bracket members are fastened to the coupling hubs, using the dowels 48 or the legs 100 and 101 to locate the bracket on the hub over a selected hole. For angular mounting, brackets 44 and 45 are used and secured with screws 46. For axial mounting, bracket 84 is used and secured with screw 88, and for radial mounting, bracket 92 is used and secured with screw 96. The set screw (not shown), which secures the marked, calibrated beam 54 at a certain length is then loosened, and the beam is adjusted for length, if necessary, to allow bead 56 to contact the bracket 45 on the opposite side of the coupling, as shown in FIGS. 1 through 3, or to allow the slidable foot 110- to contact the opposite coupling hub 86, as shown in FIG. 4. The set screw is then tightened to secure the beam, and the swivel block set screws 52 are loosened slightly to allow the swivel block 50 in bracket member 44, 84, or 92, respectively, to pivot. The block and beam 54 are then pivoted either upwardly or downwardly so that the bead 56 or foot 110 meets the opposite bracket or hub. The degree of deflection of the beam from its orientation perpendicular to the bracket member, is then measured by the dial indicator 80, or by a similar device, and recorded for this position. Measurement readings are then obtained in the opposite direction, from bracket 45 to bracket 44, as shown in FIGS. 1 through 3, or from the right side to the left side, as viewed in FIGS. 4 and 5. These readings are taken at the zero degree, the ninety degree, the one-hundred eighty degree, and the two-hundred seventy degree positions, from one side to the other and back again. The readings may be taken by rotating the shafts, or by unscrewing the bracket member and reconnecting it to the hub ninety degrees from the first position, the procedure normally followed where it is impractical or difficult to rotate the shaft. The design of the present system facilitates connections and reconnections, due to the compactness of the structure and the elimination of the numerous elements required by prior art systems to connect the systems to the shafts, such as long chains or bolts, top and bottom shaft clamping members, and the plurality of extenders which are needed to then clear the coupling flanges. The bracket members of the present system can be held with one hand while the other hand inserts and tightens the securing screw, and the system is then ready for use.

Readings are taken from one side to the other and then back again to establish graphically, or in a computer memory, the actual positions of the two shafts to be aligned, which must be determined to effect alignment. Normally, at this point in the procedure, corrections must be made for indicator sag effects. This is due to the fact that the prior art systems had the dial indicators, or other devices, mounted at the measuring end of the radial extension means or beam. This mass causes the beam to deflect, and distorts the reading taken at the 180° position. The present system, however, minimizes this problem, since beam 54 supports no more than its own weight and the minimal weight of bead 56 or foot 110, exhibiting a 10:1 reduction in indicator sag effects. Swivel block 50 may also be spring loaded to counteract the effects of gravity upon beam 54, bead 56, or foot 110. With the measurement readings taken, the computations are made to determine which of, and by how much, the supporting feet of each component machine must be shimmed to align the shaft or shafts to the reference shaft. After movements of the machinery are made, the measurement readings are normally retaken to check the accuracy of the shimming process.

While an embodiment and several modifications of a coupling alignment system have been shown and described in detail herein, various other changes and modifications may be made without departing from the scope of the present invention.

I claim:

1. A coupling alignment system for use in aligning rotatable shaft members connected by a shaft coupling, comprising, in combination:
   a. first and second coupling hubs for mounting on the opposed ends of the shaft members, each having an attachment site,
   b. a first bracket member for mounting on said first hub,
   c. a second bracket member for mounting on said second hub,
   d. a fastening means for securing said bracket members to said hubs at the respective attachment site,
   e. an extension means projecting from each of said bracket members to the opposed bracket member for contact therewith,
   f. a first measurement device mounted on one of said bracket members for indicating the degree of deflection of said extension means relative to the opposed bracket member,
   g. a second measurement device mounted on the other of said bracket members in opposed relation to said first mentioned measurement device, and
   h. a pivotally mounted swivel block mounted on each of said bracket members for slidably receiving the respective extension means.

2. A coupling alignment system as defined in claim 1 in which said bracket members have a reference surface portion extending laterally therefrom for receiving said extension means.

3. A coupling alignment system as defined in claim 1 in which said attachment sites include a plurality of threaded holes located in the periphery of said hubs, disposed at a forty-five degree angle relative to the axis of said hubs.

4. A coupling alignment system as defined in claim 1 in which said attachment sites include a plurality of threaded holes located in the periphery of said hubs, disposed parallel relative to the axis of said hubs.

5. A coupling alignment system as defined in claim 1 in which said attachment sites include a plurality of threaded holes located in the periphery of said hubs, disposed radially relative to the axis of said hubs.

6. A coupling alignment system as defined in claim 1 in which said extension means includes a calibrated beam having two ends with a contact means slidably mounted near one of said ends, and said other end being secured within said swivel block.

7. A coupling alignment system as defined in claim 6 in which said bracket members have laterally extending reference portions for receiving said contact means, and locating means for positioning said bracket members relative to said hubs.

8. A coupling alignment system as defined in claim 5 in which said bracket members have locating means thereon for positioning said bracket members relative to said hubs.

9. A coupling alignment system for use in aligning coupled, rotatable shaft members, comprising, in combination:
   a. first and second coupling hubs for mounting on the shaft members to be aligned, each having an attachment site,
   b. a first bracket member for mounting on said first hub,
   c. fastening means for securing said bracket member to said first hub,
   d. an extension means projecting substantially axially from said bracket member to said second hub and having a part for contacting said second hub, and
   e. a measurement device mounted on said bracket member for indicating the degreee of deflection of said extension means relative to said second hub.

10. A coupling alignment system as defined in claim 8 in which said system includes:
    a. a second bracket member for mounting on said second hub,
    b. fastening means for securing said second bracket member to said second hub,
    c. an extension means projecting from said second bracket member to said first hub, and
    d. a measurement device mounted on said second bracket member for indicating the degree of deflection of said second-mentioned extension means relative to said first hub.

11. A coupling alignment system as defined in claim 9 in which said attachment site includes a threaded hole in the periphery of at least one of said hubs, disposed at a forty-five degree angle relative thereto.

12. A coupling alignment system as defined in claim 9 in which said attachment site includes a threaded hole in the periphery of said hubs, disposed parallel relative thereto.

13. A coupling alignment system as defined in claim 9 in which said attachment site includes a threaded hole in the periphery of said hubs, disposed at a ninety degree angle relative thereto.

14. A coupling alignment system as defined in claim 10 in which said bracket members have a pivotally mounted swivel block therein for slidably receiving said extension means.

15. A coupling alignment system as defined in claim 14 in which said extension means includes a calibrated beam having two ends with a contact means slidably mounted near one of said ends, and said other end being secured within said swivel block.

16. A coupling alignment system as defined in claim 15 in which said bracket members have laterally extending reference portions for receiving said contact means, and locating means for positioning said bracket members relative to said hubs.

17. A coupling alignment system as defined in claim 10 in which said bracket members have locating means thereon for positioning said bracket members relative to said hubs.

18. For use with alignment systems having an attachment means with indicator means, for a coupling for connecting two rotatable shafts in end to end relation: a coupling hub for each shaft comprising:
 a. a generally cylindrical body member having inner and outer ends and an axial bore therethrough for receiving the respective shaft, and
 b. an attachment site having substantially radially and axially parallel surfaces disposed on said hub near said outer end for mounting said indicator means,
 c. said attachment site including a threaded hole in said hub, disposed at a substantially forty-five degree angle relative to said axial bore for securing the attachment means on said surfaces at said attachment site.

* * * * *